(12) United States Patent
Gilbert

(10) Patent No.: US 7,844,042 B2
(45) Date of Patent: Nov. 30, 2010

(54) SYSTEM AND METHOD FOR FORWARDING COMMUNICATIONS TO AN ALTERNATE TELEPHONE NUMBER

(75) Inventor: Quenton Lanier Gilbert, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1197 days.

(21) Appl. No.: 10/358,366

(22) Filed: Feb. 4, 2003

(65) Prior Publication Data

US 2004/0151295 A1   Aug. 5, 2004

(51) Int. Cl.
*H04M 3/42* (2006.01)
(52) U.S. Cl. .............................. 379/211.01; 379/211.02; 379/212.01; 455/417
(58) Field of Classification Search ............ 379/211.01, 379/211.02, 212.01; 455/417
See application file for complete search history.

(56) References Cited

U.S. PATENT DOCUMENTS

| | | | | |
|---|---|---|---|---|
| 5,329,578 A * | 7/1994 | Brennan et al. | ........ | 379/211.03 |
| 5,729,599 A * | 3/1998 | Plomondon et al. | .... | 379/211.02 |
| 6,442,266 B1 * | 8/2002 | Wu | ........................ | 379/211.02 |
| 6,459,784 B1 * | 10/2002 | Humphrey et al. | ..... | 379/211.02 |
| 6,571,094 B1 * | 5/2003 | Begeja et al. | ................ | 455/417 |
| 6,763,102 B1 * | 7/2004 | Chen et al. | ............. | 379/221.15 |
| 6,829,349 B1 * | 12/2004 | Neale et al. | ............ | 379/265.09 |
| 7,106,848 B1 * | 9/2006 | Barlow et al. | .......... | 379/212.01 |

* cited by examiner

*Primary Examiner*—Quynh H Nguyen
(74) *Attorney, Agent, or Firm*—Moazzam & Associates, LLC

(57) ABSTRACT

The present invention is a method and system for forwarding communications to a first destination number to a second destination number after receipt of a forwarding indication from the second destination number. In the first embodiment, the method comprises the steps of the communication device coupled to the second destination number receiving a forwarding indication, determining the first destination number to be forwarded based on the forwarding indication, and forwarding communications directed to the first destination number to the second destination number. In the second embodiment, the method comprises the steps of the client device coupled to the second destination number receiving a forwarding indication, determining the first destination number to be forwarded based on the forwarding indication, and forwarding communications directed to the first destination number to the second destination number.

12 Claims, 8 Drawing Sheets

SYSTEM AND METHOD FOR FORWARDING COMMUNICATIONS TO AN ALTERNATE TELEPHONE NUMBER

FIELD OF THE APPLICATION

The present invention generally relates to the field of telecommunications, and particularly relates to a system and method for forwarding communications directed to a first destination number to a second destination number.

BACKGROUND OF THE INVENTION

With today's increasingly mobile workforce, call forwarding has become an essential telecommunications tool. Because many people have more than one telephone number, such as a mobile number and a landline number, a caller must often predict which phone is most likely to be answered. If the caller calls the unattended phone, the caller has to either leave a voice mail message with the voice mail service or dial the alternate telephone number. This process is costly, time-consuming, and frustrating for the caller.

Call forwarding may be utilized to prevent this inconvenience to callers. To effectuate call forwarding, the user typically accesses the call forwarding system and enters the destination number for incoming calls. This process is problematic, however, because such a request is typically lengthy and requires a great deal of keystrokes. Furthermore, typically the user must enter the request for call forwarding via a communication device coupled to the telephone line to be forwarded, which may be burdensome if the communication device is not in close proximity, or the user is not at the location of the number to be forwarded. Another complication arises if the communication device is a wireless device and the communication device is lost. Additionally, in the event the communication device coupled to the line to be forwarded (hereinafter referred to as the "first destination number") is a wireless device, entering a lengthy call forwarding request could even be dangerous should the user be on the road.

Currently, there is not a system or method for allowing a user to remotely and easily communicate a forwarding request for communications originally directed to a first destination number to a second destination number. Such a system and method would not only provide added convenience for telecommunications users, but would also increase safety of users while indicating such a forwarding request on the road, because of the reduced time the user's eyes would be diverted from the road.

Therefore, there is a need for a method and system for a user to quickly and easily indicate a forwarding preference. There is also a need for an implementation of this forwarding feature in such a way that the customer may indicate the forwarding preference from the second destination number rather than from the first destination number.

SUMMARY OF THE INVENTION

Generally stated, the present invention provides a method and system for forwarding communications directed to a first destination number to a second destination number. In particular, the present invention provides a method and system for forwarding communications directed to a first destination number to a second destination number upon receipt of a forwarding indication from the second destination number. In the first embodiment, a communication device is coupled to the first destination number. In a second embodiment, the communication device is connected to a client device that is coupled to the first destination number. In both embodiments, however, both communication devices coupled to the first destination number or second destination number may either be wired or wireless devices.

In the first embodiment, the method comprises the steps of the communication device coupled to the second destination number receiving a forwarding indication, determining the first destination number to be forwarded based on the forwarding indication, and forwarding communications directed to the first destination number to the second destination number. In the second embodiment, the method comprises the steps of the client device coupled to the second destination number receiving a forwarding indication, determining the first destination number to be forwarded based on the forwarding indication, and forwarding communications directed to the first destination number to the second destination number.

Therefore, it is an object of the present invention to provide a method for forwarding communications directed to a first destination number to a second destination number upon receipt of a forwarding indication from the second destination number.

It is also an object of the present invention to provide a method for forwarding communications directed to a first destination number to a second destination number upon receipt of a forwarding indication from a second destination number, wherein a communication device at the second destination number is coupled to a client device.

Still a further object of the present invention is to provide a system for forwarding communications directed to a first destination number to a second destination number upon receipt of a forwarding indication from a second destination number. That the present invention and the preferred embodiment thereof overcome the drawbacks set forth above and accomplish the objects of the invention set forth herein will become apparent from the detailed description of the present invention to follow.

DETAILED DESCRIPTION

Generally stated, the present invention provides a method and system for forwarding communications directed to a first destination number to a second destination number. More specifically, the present invention provides a convenient way for a user to indicate a forwarding preference via a second destination number for communications directed to a first destination number.

Figure 1:
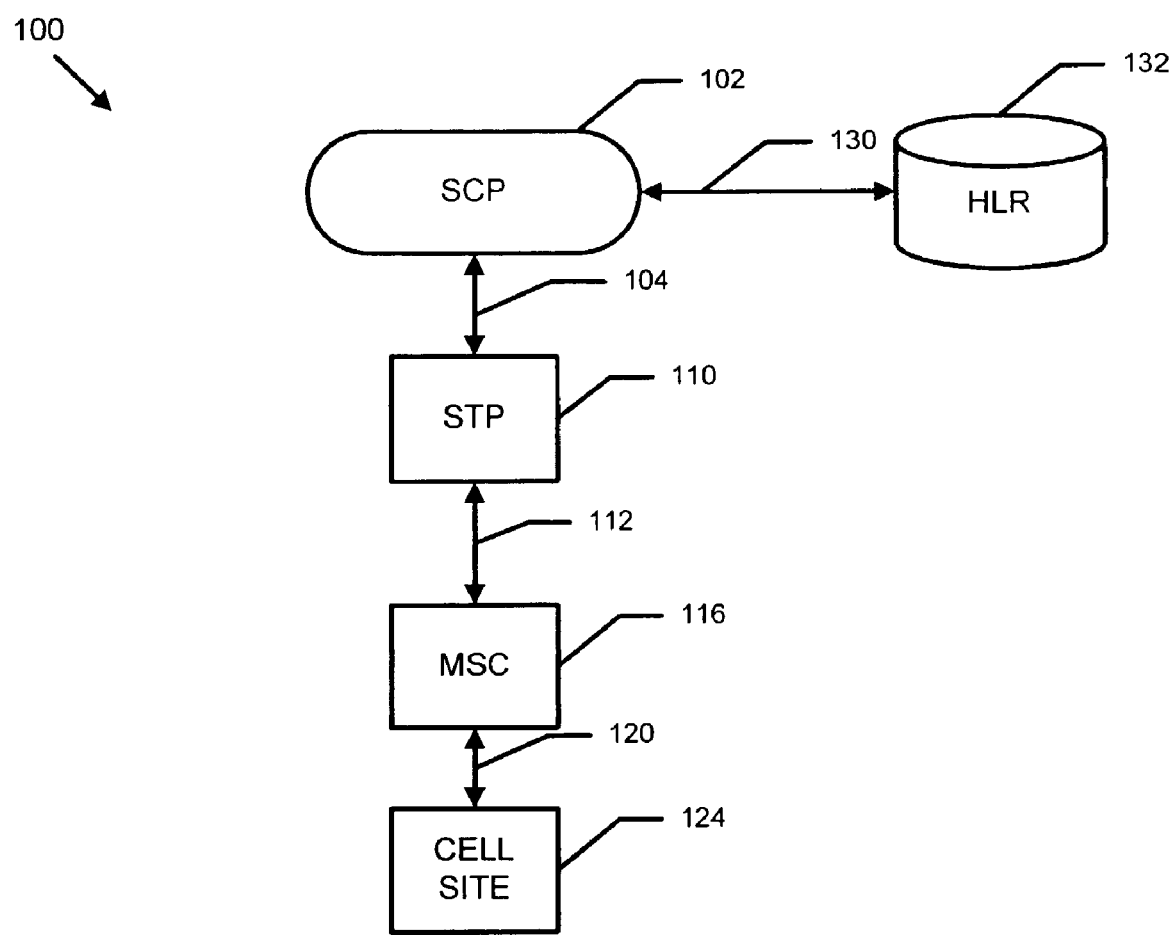
FIG. 1 is an exemplary signaling network environment based on standard Advanced Intelligent Networking (AIN) architecture known by those skilled in the art for the first and second embodiments of the present invention.

FIG. 1 is an exemplary signaling network environment based on standard Advanced Intelligent Networking (AIN) architecture known by those skilled in the art for the first and second embodiments of the present invention. Signaling network 100 comprises the signaling control point 102 ("SCP") at the top of the network hierarchy. SCP 102 is coupled to a Home Location Register 132 ("HLR") via bi-directional communications link 130. Typically, bi-directional communications link 130 is the CC-SS7 network (the "SS7 network"). HLR 132 is a database that stores, among other things, the current locations of users and the services to which the users have access. HLR 132 may also comprise a relational database for storing data entries for telephone number combinations as described in FIG. 4, such as a mobile telephone number and an associated landline telephone number.

One or more signaling transfer points ("STPs") 110 are coupled to SCP 102 via bi-directional communication links 104. STPs 110 are also coupled to one or more mobile switching centers ("MSCs") 116 via bi-directional communication links 112. MSCs 116 are digital telephone switches for distributing communications to the one or more cell sites 124. A MSC sends signaling to other MSCs to set up, manage, and release the voice circuits required to make a call. Communications are then distributed to the one or more cell sites 124 from MSC 116 via bi-directional communications links 120.

Figure 2:
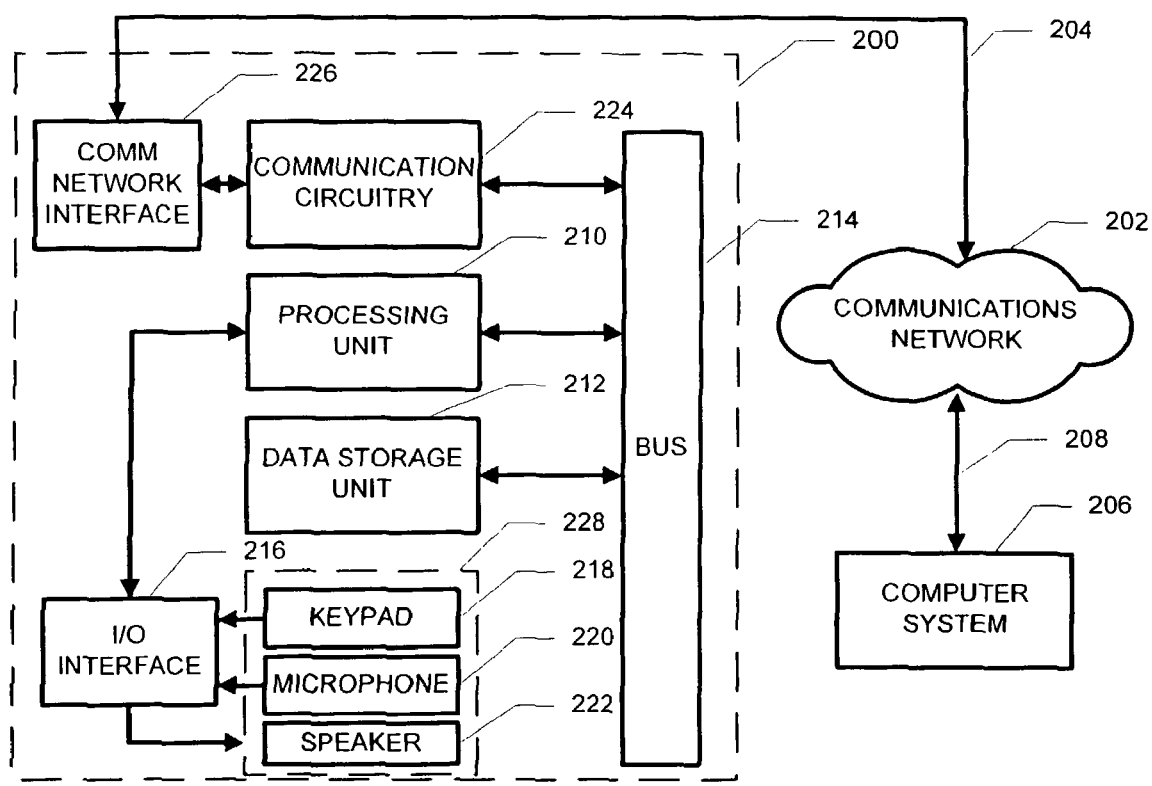
FIG. 2 is a block diagram representation illustrating an exemplary system in accordance with the first embodiment of the present invention.

FIG. 2 is a block diagram representation illustrating an exemplary system in accordance with the first embodiment of the present invention. The communication device 200 places and receives communications with the communications network 202, in addition to any other communications, via a bi-directional communications link 204. Computer system 206 may also communicate with communication device 200, and is coupled to communications network 202 via a bi-directional communications link 208.

Communication device 200 may be any device capable of receiving and transmitting voice or data on a communications network to establish communication with another communication device. In the first embodiment of the present invention, this communication device 200 is a telephone device such as a wireless or a wired device. In a second embodiment, described in FIG. 5, the communication device is coupled to a client device, which is coupled to a communications network. However, those skilled in the art will recognize that the communication device in both embodiments may be any device capable of communicating with a communications network.

In the first embodiment, as depicted in FIG. 1, communication device comprises a processing unit 210 which is communicatively coupled via bi-directional communications link to the other components of the communication device via a bus 214. Communication device 200 also comprises an I/O interface 216, which may reside on the same microprocessing chip as the processing unit 210. However, I/O interface 216 may also reside on an external unit. I/O interface 216 connects the processing unit 210 to a user interface 228.

In the case of a telephone device such as a wireless or wired device, user interface 228 comprises keypad input 218, microphone input 220, and speaker output 222. The I/O interface 216 may include an analog-to-digital converter for converting an analog microphone signal to a digital signal for use by the processing unit 210. I/O interface 216 may also include a digital-to-analog converter to convert digital information from the processing unit 210 to the speaker 222, such as voice data.

Figure 3:
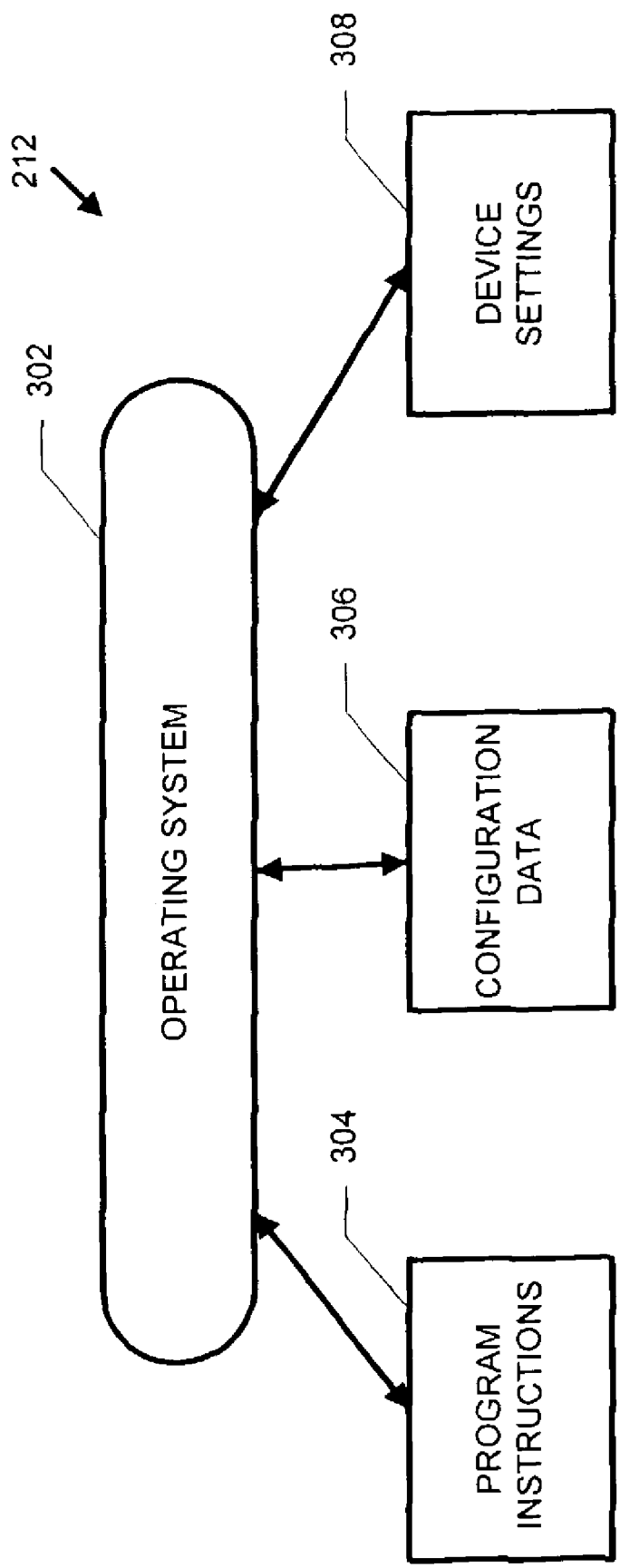
FIG. 3 is a block diagram representation of the data storage unit of the communication device in accordance with the first and second embodiments of the present invention.

Communication device 200 further comprises a data storage unit 212, which is discussed in greater detail in FIG. 3. Data storage unit 212 may be any type of memory, including but not limited to RAM, EPROM, or EEPROM memory, and may store either volatile or non-volatile memory. The processing unit 210 and the data storage unit 212 may communicate via a system bus 214. Alternatively, the processing unit 210 and the data storage unit 212 may be included on the same microprocessing chip.

The processing unit 21 0 transmits and receives digital signals to be communicated outside the communication device 200 via the communication circuitry 224. The communications circuitry 224 communicates with the communications network 202 via bi-directional communications link 204. If communication device 200 is a wireless device, the communication circuitry 224 is connected to communications network interface 226, which is an antenna in the wireless device embodiment. Antenna 226 then communicates signals through airwaves to communications network 202 via a bi-directional communications link 204. The bi-directional communications link 204 is a wireless link established when a call is placed to or from the communication device 200, or when another activity involving the utilization of bandwidth occurs with communication device 200.

If communication device 200 is a wired communications device, communication network interface 224 communicates with the communications network 202, which is the Public Switched Telephone Network (PSTN). This communication is enabled via bi-directional communications link 204, which is a wired connection if communication device 200 is a wired communications device.

Communications network 202 includes various components required to enable communication between two or more communication devices, including wired connections, wireless connections, switches, and other devices for establishing communication in the network. Communications network 202 is also communicatively coupled to a computer system 206 via a bi-directional communication link 208. The computer system 206 may be any computer system interacting with the communications network, including but not limited to, an instant messaging client or a server for a wireless services carrier.

FIG. 3 is a block diagram representation of the data storage unit 212 of the communication device in accordance with the first and second embodiments of the present invention. Data storage unit 212 comprises operating system 302, which contains instructions for operating the communication device 200. The program instructions unit 304 includes instructions for the processing unit to execute the methods disclosed in the first and second embodiments of the present invention, in addition to any other instructions. The configuration data unit 306 is also included in the data storage unit 212, and contains configuration information regarding the assortment of components that make up the system of the present invention.

The data storage unit 212 further comprises a device settings unit 308. The device settings unit 308 contains various parameters indicating the settings of the communication device 200, in addition to any other data. Device settings which may be stored in the device settings unit 308 include, but are not limited to, ring type, touch tone type, or appearance of the user interface 228.

Figure 4:
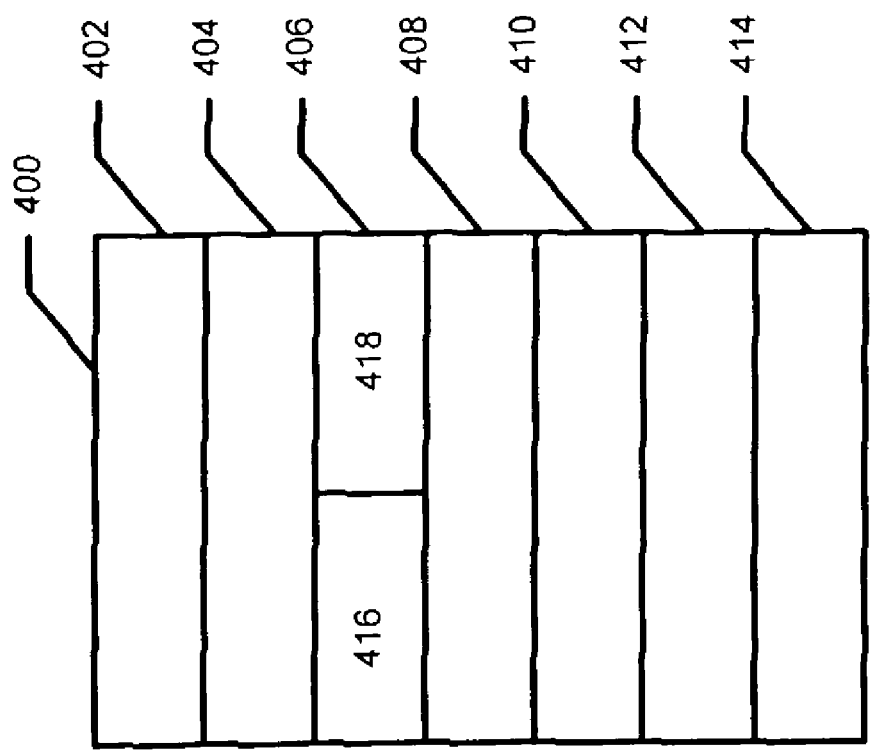
FIG. 4 is a block diagram representing an exemplary data structure for the relational database in accordance with the first and second embodiments of the present invention.

FIG. 4 is a block diagram representing an exemplary data structure of the relational database in accordance with the present invention. Relational database 400 may be located anywhere within signaling system 100. In the first and second embodiments, however, relational database 400 is located within HLR 132.

Relational database 400 contains one or more entries, shown as entries 402-414. These entries exist for every number registered for a service providing the method of the present invention. Data entry 406 illustrates the components of each data entry within the relational database 400. Sub-entry 416 may store a value representing the first destination number, and sub-entry 418 may store a numerical value representing the second destination number. Additional sub-entries may exist for each entry for the relational database. For example, each entry could even contain four sub-entries: a home landline, a home wireless device, a work landline, and a work wireless device. In this situation, the receipt of a forwarding request from one of the numbers may forward communications to any of the other three numbers to the number generating the forwarding request. Thus, as many sub-entries as needed for accommodation of each user's forwarding needs may exist for each entry.

Figure 5:
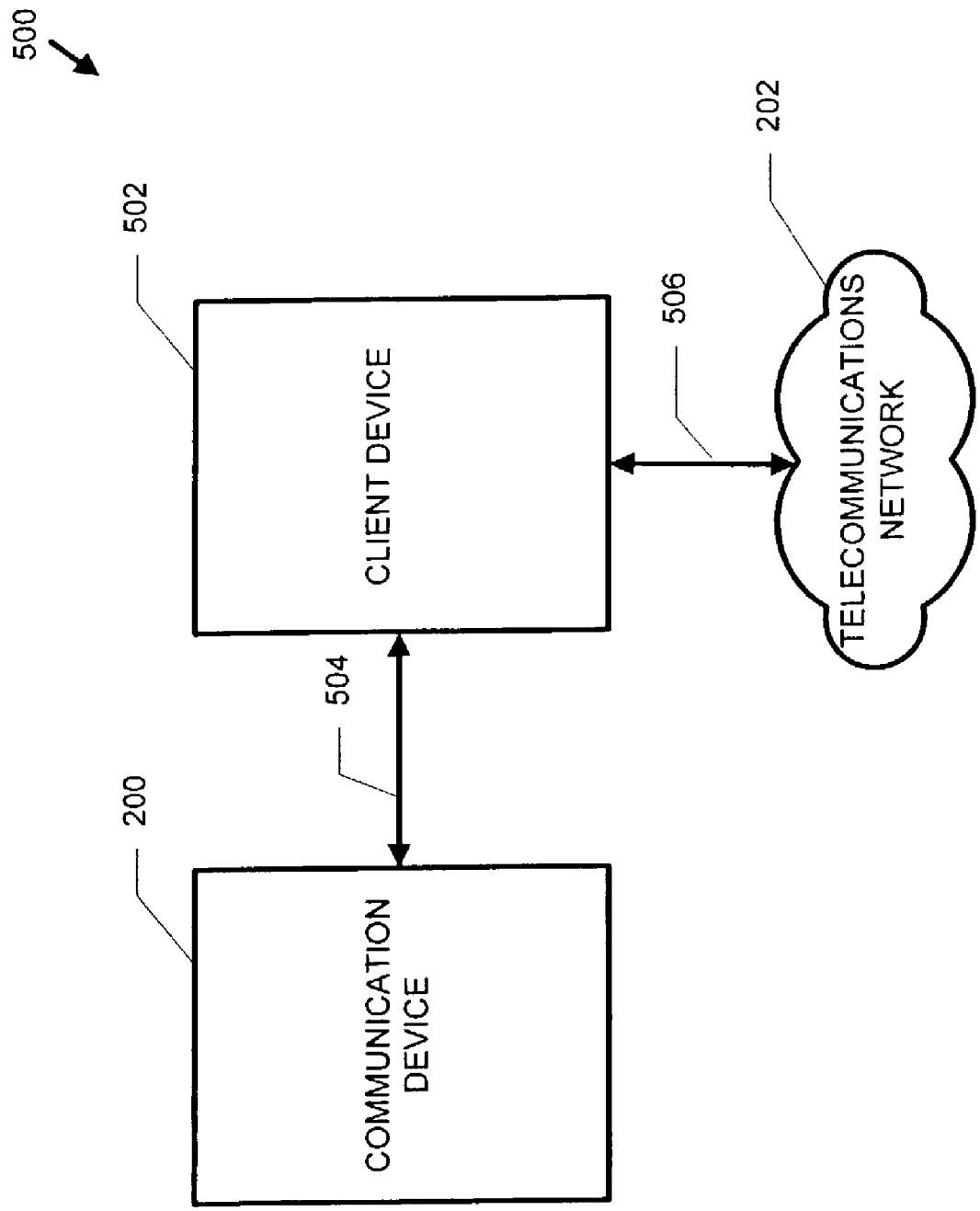
FIG. 5 is a block diagram representation of an exemplary system in accordance with the second embodiment of the present invention.

FIG. 5 is a block diagram representation of an exemplary system in accordance with the second embodiment of the present invention. System 500 involves a communication device 200 connected to a client device 502. In this second embodiment, the communication device 200 is the same communication device 200 described in FIG. 2. Communication device 200 is connected via a bi-directional communications link 504 to client device 502. Bi-directional link 504 may be a wireless link, established via a wireless data transfer protocol such as the Bluetooth technology, or a wired connection.

The client device 502 contains substantially the same components as the communication device 200 as described in FIG. 2. However, the client device 502 may comprise any device capable of operating with a communication device 200 such as a personal computer or another wireless device. Bi-directional communication link 506 communicatively couples the client device 502 and the communications network 202. Bi-directional link 506 may be a wireless link, established via a wireless data transfer protocol such as the Bluetooth technology, or alternatively, a wired connection.

Figure 6:
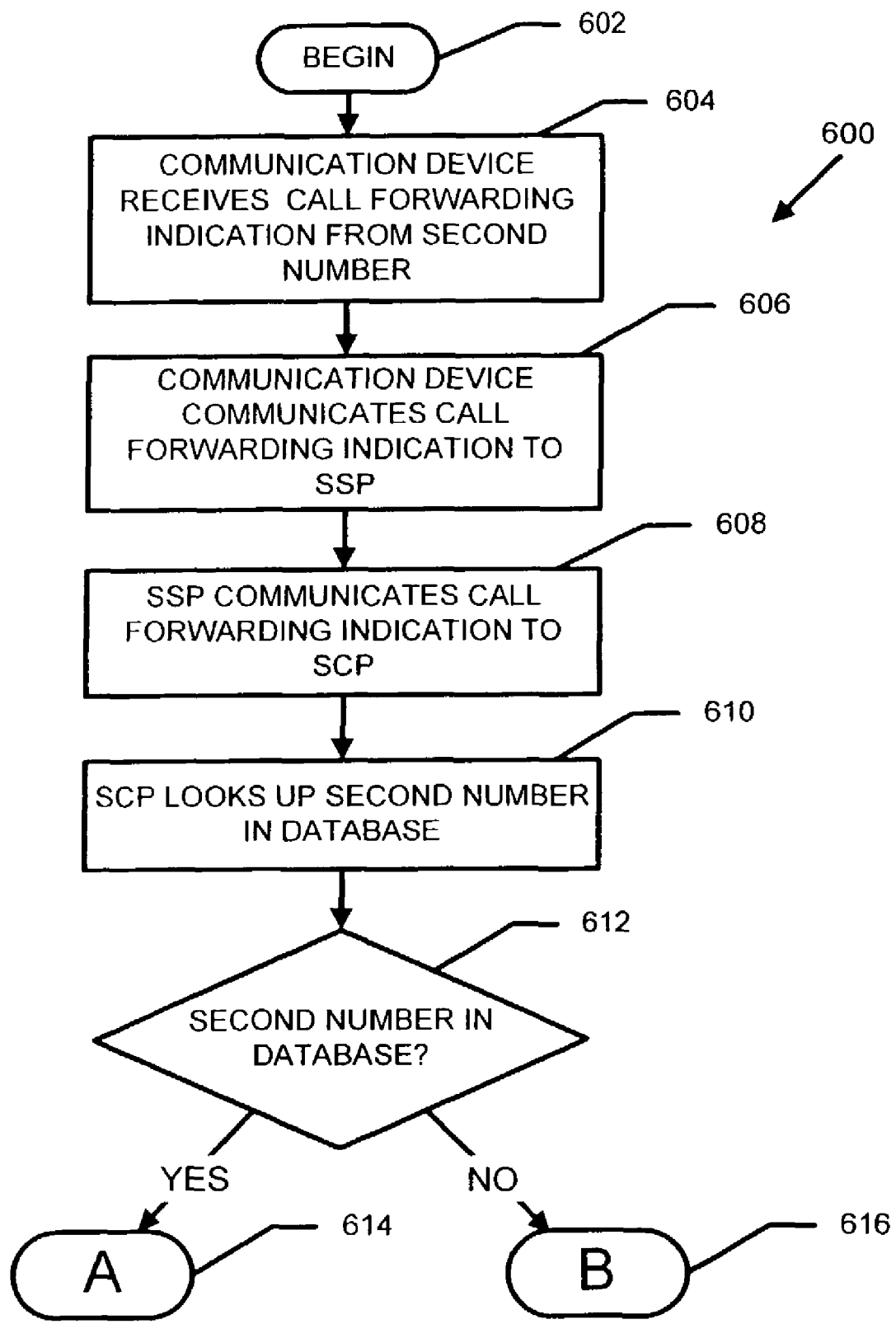
FIG. 6 is a flow diagram illustrating the first embodiment of the present invention from the perspective of the system.

FIG. 6 is a flow diagram illustrating the first embodiment of the present invention from the perspective of the system. Method 600 begins with step 602 and proceeds to receipt of a forwarding indication from the second destination number at step 604. The forwarding indication may take any form sufficient of being communicated from the second dialed number to the communications network, including but not limited to, a key sequence entered via keypad 218, actuation of a dedicated button on the body of a communication device connected to the second destination number, or a voice command uttered into microphone 220 of communication device 200 coupled to the second destination number.

After the receipt of this forwarding indication from the second destination number at step 604, a trigger fires on MSC 116 and the forwarding indication is communicated to the SCP 102. After MSC 116 receives the trigger, the MSC 116 communicates the forwarding indication to the SCP 102 at step 608. This forwarding indication may include any information necessary to effectuate the forwarding request, including but not limited to, the identification of the second destination number.

Once the SCP 102 receives the forwarding request from the MSC 116, the SCP 102 determines if the second destination number is located in the database located in the HLR 132. If the second destination number is found in the database at step 612, the method 600 proceeds to 614, which is discussed in FIG. 7. If the second destination number is not located in the database, the method 600 proceeds to 616, which is discussed in FIG. 8.

Figure 7:
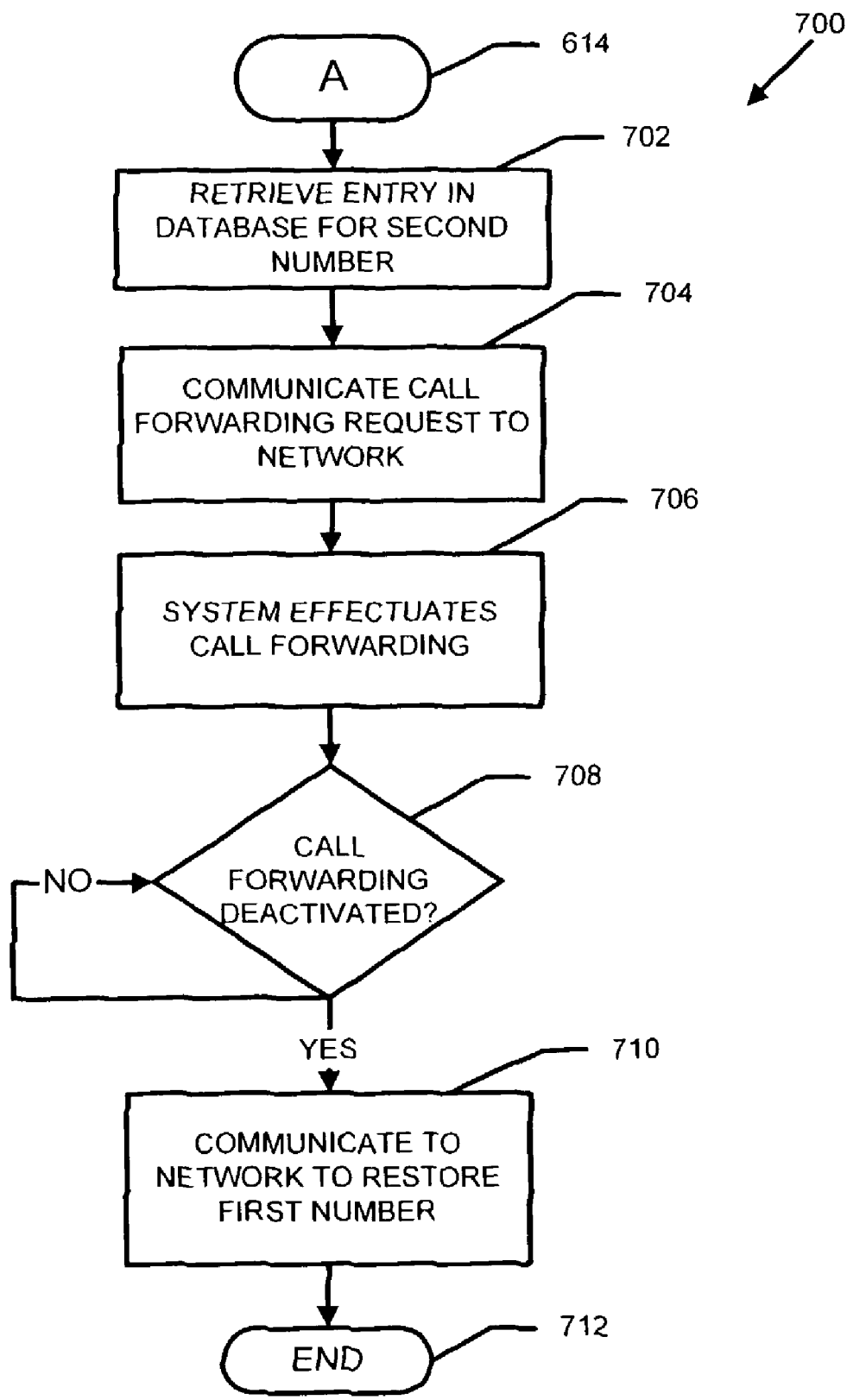
FIG. 7 is a flow diagram further illustrating the first embodiment of the present invention from the perspective of the system if the second destination number is included within the database.

FIG. 7 is a flow diagram further illustrating the first embodiment of the present invention from the perspective of the system if the second destination number is included within the database. If an entry for the second destination number is located in the database 400, then the method 700 proceeds from point A at step 614 to the retrieval of the first destination number from the database 400 at step 702. This first destination number would be the number stored alongside the second destination number in database 400.

If the communication device 200 is a wireless device, method 700 next sends a message to the database 132 to utilize the second destination number as a forwarding number. This forwarding process comprises storing the first number as the roaming number for the second number in the HLR. Once the second destination number is stored in the HLR 132 as the forwarding number for the first destination number, the forwarding feature is effectuated. Any incoming communications to the first destination number are then forwarded to the second destination number until the forwarding feature is deactivated at step 706. If the communication device is a wireless device, and the wireless device is actually roaming, the present invention will overwrite any roaming number assigned to that wireless device.

Forwarding is then deactivated at step 708 by removing the second destination number as the forwarding number for the first destination number in the database. If the communication device is a wireless device, and the wireless device is actually roaming, deactivation of call forwarding will result in ceasing to overwrite the roaming number for the wireless device. Method 700 then concludes at step 710.

If communication device 200 coupled to the first destination number is a wired device, the method in FIG. 7 proceeds the same as if the communication device is a wireless device of steps 704 and 708. However, instead of communicating the second destination number as a roaming number for the first destination number to the HLR 132, at step 704 the forwarding request is instead communicated to the network by effectuating forwarding as performed in wireline networks. Likewise, at step 708, the network restores the first destination number by issuing a forwarding deactivation as is performed in wireline telephone networks.

Figure 8:
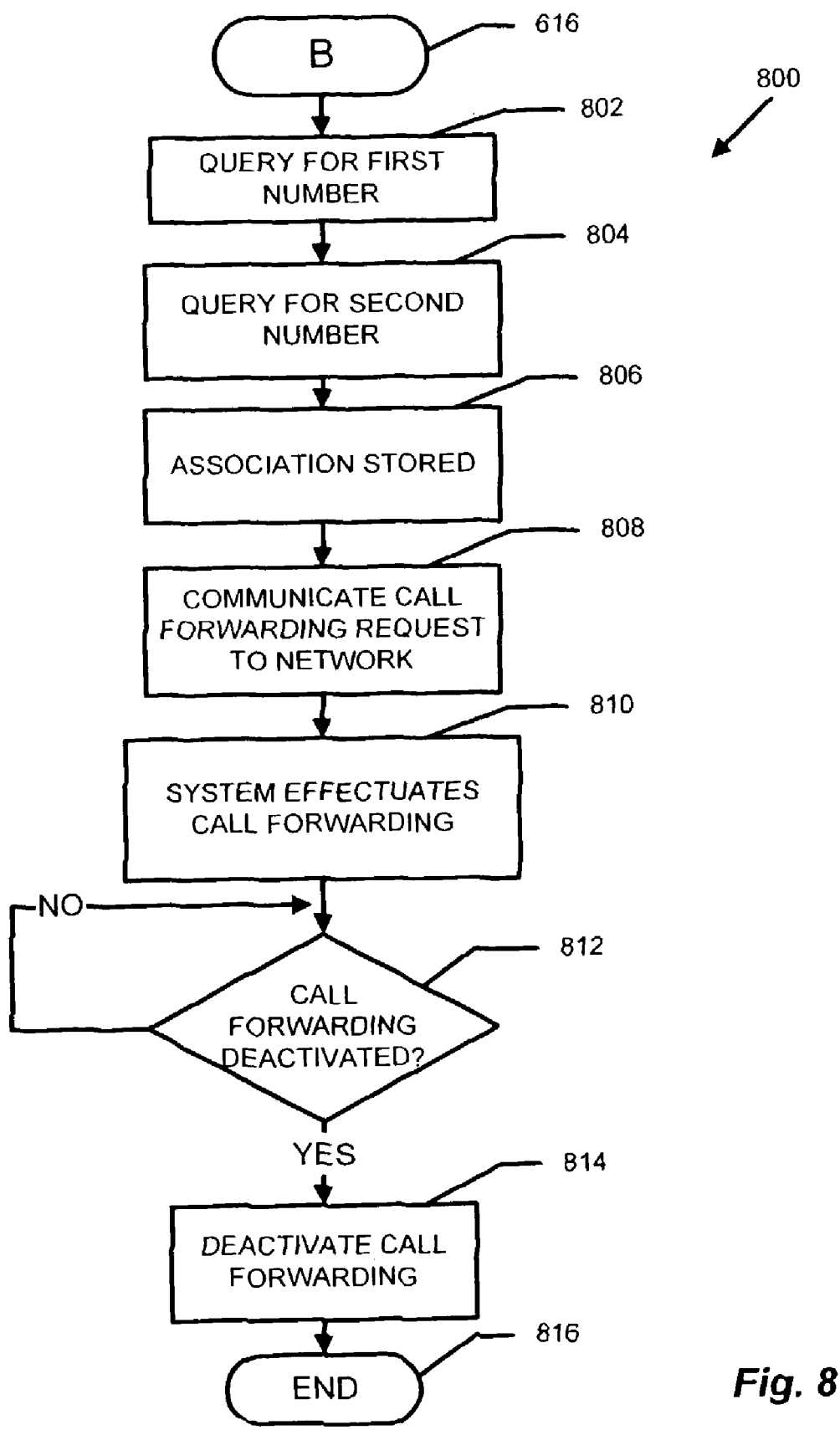
FIG. 8 is a flow diagram illustrating the first embodiment of the present invention from the perspective of the system if the second destination number is not included within the database.

FIG. 8 is a flow diagram illustrating the first embodiment of the present invention from the perspective of the system if the second destination number is not included within the database. Method 800 begins at step 616 and proceeds to query for the first destination number at step 802. At step 804, the method queries for the second destination number 804. The association of the first destination number and the second destination number is stored in a memory, which may be, but is not required to be, data storage unit 218. This association may take the form of an entry in a table, as illustrated in FIG. 4. In such a situation, the first destination number 416 may be stored alongside second destination number 418. This arrangement allows the second destination number to be used as an index to retrieve the first destination number.

Once both numbers are received, the forwarding request is communicated to the communications network at step 808. Any incoming communications to the first destination number are then forwarded to the second destination number until the forwarding feature is deactivated at step 808. If the communication device is a wireless device, and the wireless device is actually roaming, effectuating call forwarding comprises overwriting any roaming number assigned to that wireless device.

Forwarding is then deactivated at step 810 if the communication device at the first destination number is a wireless device by removing the second destination number as the roaming number for the first destination number in the database. De-activation of the forwarding may be initiated in response to a command entered into the communication device coupled to the second destination number, including but not limited to, a key sequence, a voice command, a selection of an icon on the display of the communication device, or actuation of a dedicated button on the body of the communication device.

If the communication device at the first destination number is a not a wireless device, then the forwarding feature for wired devices for the first destination number is disabled at step 810. If the communication device is a wireless device, and the wireless device is actually roaming, deactivation of call forwarding will result in ceasing to overwrite the roaming number for the wireless device. Method 800 then concludes at step 812.

Other embodiments of this invention will be apparent to those skilled in the art from consideration of the specification and practice of the invention disclosed herein. It is intended that the specification and examples be considered as exemplary only, and within the scope and spirit of the invention as indicated in the description and the following claims.

The invention claimed is:

1. A method for promoting safety in forwarding communications, the communications being directed to a first wireless destination number, to a second wireless destination number, the method comprising:
    receiving a safe forwarding indication at a network device, the safe forwarding indication originating from one of a voice command, a selection of an icon, and the pressing of a dedicated button from a communication device associated with the second wireless destination number, the forwarding indication including the first wireless destination number, the second wireless destination number, and forwarding instructions stored in a data storage unit on the communication device;
    determining that a relational database does not contain an association of the first wireless destination number and the second wireless destination number;
    associating the second wireless destination number with the first wireless destination number at the network device;
    storing the association between the first and second wireless destination numbers in the relational database;
    wherein the first wireless destination number stored alongside the second wireless destination number that allowing the second wireless destination number to be used as an index to retrieve the first wireless destination number; and
    forwarding communications directed to the first wireless destination number to the second wireless destination number.

2. The method of claim 1, wherein the receiving a forwarding indication from a communication device associated with the second wireless destination number further comprises receiving a signal originating from the entry of a key sequence into the communication device coupled to the second wireless destination number.

3. The method of claim 2, wherein receiving a signal originating from the entry of a key sequence into the communication device comprises receiving a star code sequence entered into a keypad of a communication device coupled to the second wireless destination number.

4. A system for promoting safety in forwarding communications, the communications being directed to a first wireless destination number, to a second wireless destination number following receipt of a safe forwarding request from the second wireless destination number, the system comprising:
    a processing unit resident in a communication device coupled to the second wireless destination number;
    a memory accessible to the processing unit for storing the first wireless destination number associated with the second wireless destination number, wherein the first wireless destination number is representative of the number to be forwarded; and
    a plurality of instructions executable by the processing unit to forward communications, the communications being directed to the first wireless destination number, to the second wireless destination number upon receipt of a safe forwarding request from the communication device coupled to the second wireless destination number, the safe forwarding request originating from one of a voice command, a selection of an icon, and the pressing of a dedicated button-from the communication device, the safe forwarding request including the first wireless destination number, the second wireless destination number, and forwarding instructions,
    determine that a relational database does not contain an association of the first wireless destination number and the second wireless destination number;
    associate the second wireless destination number with the first wireless destination number at the network device; and
    store the association between the first and second wireless destination numbers in the relational database;
    wherein the first wireless destination number stored alongside the second wireless destination number that allowing the second wireless destination number to be used as an index to retrieve the first wireless destination number.

5. The system of claim 4 wherein the system further comprises a user interface communicatively coupled to the processing unit for receipt of the forwarding request.

6. The system of claim 5, wherein the user interface comprises a keypad.

7. The system of claim 5, wherein the user interface comprises a microphone.

8. The system of claim 5, wherein the user interface further comprises a speech recognition unit.

9. The system of claim 5, wherein the user interface comprises a touch screen.

10. The system of claim 4, wherein the call forwarding request further comprises a star code entered into the keypad.

11. The system of claim 4, wherein the call forwarding request further comprises a key sequence entered into the keypad.

12. The system of claim 4, wherein the plurality of instructions is a first plurality of instructions and the system further comprises a second plurality of instructions executable by the processing unit to cause storage of the first wireless destination number in the memory in response to the receipt of the first wireless destination number from the second wireless destination number.

* * * * *